United States Patent [19]
Kwako

[11] 3,950,879
[45] Apr. 20, 1976

[54] DECOY WEIGHT-CARRIER
[76] Inventor: Stanley J. Kwako, Heaton, N. Dak. 58450
[22] Filed: Feb. 7, 1975
[21] Appl. No.: 547,945

[52] U.S. Cl. ................................................ 43/3
[51] Int. Cl.² ..................................... A01M 31/06
[58] Field of Search ..................................... 43/2, 3

[56] References Cited
UNITED STATES PATENTS

| | | |
|---|---|---|
| 710,433 | 10/1902 | Coudon .................................. 43/3 |
| 1,604,615 | 10/1926 | Stoner .................................... 43/3 |
| 2,817,918 | 12/1957 | Phillips ................................... 43/3 |
| 2,880,544 | 4/1959 | Crummer et al. ...................... 43/3 |

Primary Examiner—Warner H. Camp
Attorney, Agent, or Firm—Millen, Raptes & White

[57] ABSTRACT

A collapsible decoy and combined carrier and weight. The carrier functions both as a carrier for the folded decoy and also as a weight when immersed in and filled with water. The carrier is connected to the decoy by string means. In use, the immersed carrier functions as a weight to retain the decoy on the surface of the water.

3 Claims, 2 Drawing Figures

DECOY WEIGHT-CARRIER

BACKGROUND OF THE INVENTION

This invention relates to improvements in decoy ducks and more particularly to a decoy carrier or pouch which also serves as a weight or stabilizer for the decoy when it is placed on a water surface.

The use of decoy ducks by hunters for hunting ducks is common and these decoys are usually made of a rubber material or the like. The decoys usually have weights inserted in them or attached to the decoy by a string or the like. The purpose of the weights is to retain or hold the decoy in place while it is floating on the water surface. However, it is objectionable to the hunters to have to carry the decoys with the weights to the water site. Furthermore, if the weights are attached to the decoy by string means, a problem usually arises for the hunter upon arriving at the hunting site, in that the weights and string have become entangled and the disentangling thereof results in loss of valuable time.

BRIEF DESCRIPTION OF THE INVENTION

In accordance with this invention, the above disadvantages are overcome by providing an individual carrier or pouch combined with a collapsible decoy connected by a string or the like. This carrier is made of the same material as the decoy and is light and easy to carry. Each carrier is adapted to carry within its confines a decoy and attached string means, whereby entanglement with other decoys and strings is avoided. The carrier is open at one end and when it is filled with water in use with the decoy serves as a weight to retain or hold the decoy in place.

DETAILED DESCRIPTION OF THE INVENTION

Figures 1, 2:
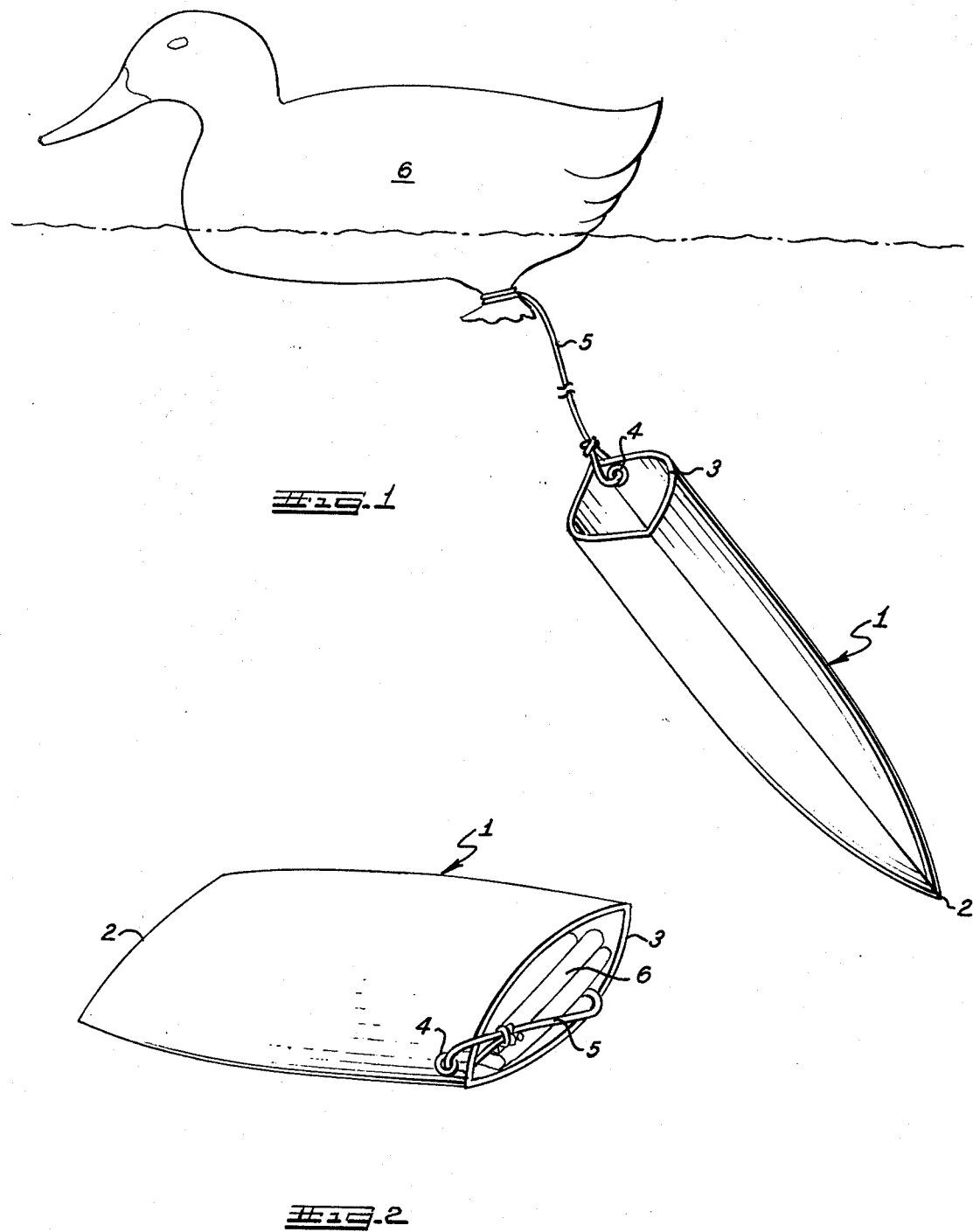
FIG. 1 is a side elevational view of a collapsible decoy as it appears floating on the water simulating a duck, and also showing in perspective view the carrier attached thereto in the water.
FIG. 2 is a perspective view of the carrier showing the decoy folded within its confines in the carrying model.

The combined collapsible decoy duck and carrier-weight is shown in use in FIG. 1. In FIG. 2, the carrier is shown with the decoy duck folded therein and adapted to be easily carried by a hunter.

The carrier comprises a body, generally denoted by the numeral 1, a closed end 2, and an open end 3. The carrier can be made of the same material as the decoy, i.e., a one layer, water proof, rubber material or the like. The carrier is adapted to receive and contain the collapsed, folded decoy duck 6. Thus, the decoy can be folded and placed within the body 1 of the carrier through opening 3 wherein the folded decoy is snugly retained. The decoy 6 is attached to the carrier by string means 5 which are connected to the bottom portion of the duck, such as the feet, and also to the service hole 4 in body 1 of the carrier. The string means when the decoy is not in use are also placed within the carrier body to prevent entanglement.

The decoy duck is easily carried to the hunting site within the carrier. At the site, the decoy 6 is removed from the body 1, and is inflated as is customary. The carrier is placed in the water with bottom 2 first. Water enters body 1 through opening 3 and as the carrier becomes filled with water it sinks in the water and pulls decoy 6 onto the surface of the water. In this manner, the decoy is held in place on the surface of the water by the carrier which when full of water functions as a weight.

When it is desired to remove the decoy from the water, the decoy is pulled up bringing the carrier to the surface, at which time, the water is emptied from the carrier through opening 3. The decoy is deflated and is inserted along with the string means through opening 3 into the body of the carrier.

I claim:

1. A collapsible decoy and a combined carrier and weight, said decoy and carrier connected to each other by string means, said decoy adapted to float on water, said carrier comprising body means open at one end and adapted to receive and contain said decoy and string means in a folded manner for carrying purposes, said carrier adapted to be immersed and filled with water thereby functioning as a weight, whereby said decoy is retained in place on the surface of the water.

2. The decoy and combined carrier and weight of claim 1 wherein said carrier comprises a service hole adjacent said open end, to which said string means is attached.

3. The decoy and combined carrier and weight of claim 1 wherein the material of the decoy and carrier is the same and comprises a water proof flexible material.

* * * * *